United States Patent

Wada et al.

[11] Patent Number: 5,835,512
[45] Date of Patent: Nov. 10, 1998

[54] WAVELENGTH SELECTING METHOD IN WAVELENGTH TUNABLE LASER AND WAVELENGTH SELECTABLE LASER OSCILLATOR IN WAVELENGTH TUNABLE LASER

[75] Inventors: Satoshi Wada; Kazuyuki Akagawa; Hideo Tashiro, all of Saitama, Japan

[73] Assignee: Rikagaku Kenkyusho, Saitama, Japan

[21] Appl. No.: 769,989

[22] Filed: Dec. 19, 1996

[30] Foreign Application Priority Data

Dec. 19, 1996 [JP] Japan .................................. 7-348782

[51] Int. Cl.$^6$ .................................................. H01S 3/117
[52] U.S. Cl. .............................. 372/13; 372/19; 372/23; 372/27; 372/32; 372/105
[58] Field of Search ................................ 372/13, 20, 19, 372/26, 27, 28, 23, 32, 92, 98, 99, 105, 108

[56] References Cited

U.S. PATENT DOCUMENTS

| | | | |
|---|---|---|---|
| 4,250,466 | 2/1981 | Jernigan et al. | 372/13 X |
| 4,665,524 | 5/1987 | Cotter | 372/13 X |
| 4,945,539 | 7/1990 | Bagshaw et al. | 372/13 |
| 5,022,034 | 6/1991 | May et al. | 372/26 |
| 5,121,245 | 6/1992 | Johnson | 372/27 X |
| 5,260,953 | 11/1993 | Rowe | 372/20 |
| 5,521,930 | 5/1996 | Suni et al. | 372/13 |

OTHER PUBLICATIONS

Richter et al., 2319 Optics Communications, vol. 84, No. 3/4, Jul. 15, 1991 (NL).

Schweicher et al., 8251 Revue HF Tijdschrift, XIV (1988) No. 3/4 (BE).

Mazur et al., 2287 Soviet Journal of Quantum Electronics, vol. 15, No. 4 (Apr. 1988).

Taylor et al., Applied Physics Letters, vol. 19, No. 8, Oct. 15, 1971 (USA).

Wada et al., Optics Letters, vol. 21, No. 10, May 15, 1996 (Opt. Soc. of America).

Taylor et al., Applied Physics Letters, vol. 19, No. 8, pp. 267–271 (Oct. 1971), "Electronic Tuning of a Dye Laser Using the Acousto–Optic Filter".

*Primary Examiner*—Brian Healy
*Attorney, Agent, or Firm*—Birch, Stewart, Kolasch & Birch, LLP

[57] ABSTRACT

An object of the present invention is to electrically tune and control an oscillating wavelength of a laser at high rate having a good reproducibility without providing any mechanically movable section in the laser resonator. To achieve the object, a laser oscillator is provided comprising a laser resonator composed of a mirror on the output side and a total reflection mirror, a Ti:Al$_2$O$_3$ laser crystal disposed in the laser resonator, an acousto-optic crystal disposed in the laser resonator and to which are inputted the outputting light rays from the Ti:Al$_2$O$_3$ laser crystal, a piezoelectric element mounted on the acousto-optic crystal to input acoustic waves thereto, and a diffraction light ray correcting prism disposed in the laser resonator and for correcting an angle of deflection of the diffraction light rays outputted from the acousto-optic crystal.

12 Claims, 6 Drawing Sheets

WAVELENGTH SELECTING METHOD IN WAVELENGTH TUNABLE LASER AND WAVELENGTH SELECTABLE LASER OSCILLATOR IN WAVELENGTH TUNABLE LASER

BACKGROUND OF THE INVENTION

1. Field of the Invention

The present invention relates to a wavelength selecting method in a wavelength tunable laser as well as a wavelength selectable laser oscillator in a wavelength tunable laser, and more particularly to a wavelength selecting method and a wavelength selectable laser oscillator which can control a laser oscillation wavelength by an electrical means at high scanning rate and in a highly reliable manner in a wavelength tunable laser.

1. Description of the Related Art

Wavelength tunable lasers are generally known. Solid laser, wherein a crystal such as Ti:$Al_2O_3$ (titanium sapphire) and the like is utilized as a laser medium and liquid lasers, wherein a dye solution and the like is utilized as a laser medium have been widely employed.

Heretofore, a wavelength selecting method in laser-oscillation for a wavelength tunable laser as described above in a desired wavelength included a wavelength selecting method wherein a diffraction gating, a birefringent plate or the like is disposed in a laser resonator containing a wavelength tunable laser medium. The diffraction gating, birefringent plate or the like, as described above, is mechanically rotated, whereby only the light rays having a desired wavelength are picked up from among light rays outputted from the wavelength tunable laser medium. Furthermore the light rays thus picked up are allowed to reflect within the wavelength tunable laser resonator to grow to start laser oscillation, so that only the laser light rays having a desired wavelength are outputted from the laser resonator.

However, in the case when such conventional wavelength selecting method as described above is applied, there were problems in that it was difficult to increase a wavelength scanning speed and in that wavelengths could be swept in only a single direction for elevating precision in the wavelength reproduction, because a diffraction grating, a birefringent plate or the like was mechanically rotated.

As a means for solving such problems as described above, an electrical wavelength sweeping method for a pulsed dye laser has been proposed by Taylor et al. (reference literature: APPLIED PHYSICS LETTERS, Vol. 19, No. 8, Oct. 15, 1971, pp. 269–271 "Electronic Tuning of Dye Laser using the Acousto-Optic Filter", D. J. Taylor, S. E. Harris, S. T. K. Nieh and T. W. Hansch).

The electrical wavelength sweeping method for a pulsed dye laser proposed by Taylor et al. includes $CaMoO_4$ crystal placed in a dye solution as a laser medium, acoustic waves inputted to the $CaMoO_4$. crystal, and a resonator constituted by light ray components which interact with the acoustic waves thereby permitting an oscillating wavelength of the laser to be tunable.

However, the electrical wavelength sweeping method for a pulsed dye laser as proposed by Taylor et al. involved the following problems.

(1) A wavelength range which can be made tunable in accordance with the method is narrow.

(2) A complicated constitution is required for integrating a dye into the system with a crystal.

(3) A special crystal of $CaMoO_4$ is required.

(4) A difference between the light ray components which interacted and that which did not interact is due to rotation of plane of a polarization, so that the separation thereof is difficult.

OBJECT AND SUMMARY OF THE INVENTION

The present invention has been made in view of the problems as described above involved in the prior art. Accordingly, an object of the present invention is to provide a wavelength selecting method in a wavelength tunable laser and a wavelength selectable laser oscillator in a wavelength tunable laser by which a laser wavelength is electrically controlled to be capable of sweeping the wavelength at a high speed, whereby miniaturization of the whole equipment is intended. Furthermore, a stable wavelength selecting action can be realized by employing an acousto-optic crystal which has been widely spread and has high reliability as an independent component without accompanying any mechanically movable section such as a rotating mechanism and the like.

In order to achieve the above described object, the wavelength selecting method in a wavelength tunable laser and a wavelength selectable laser oscillator in a wavelength tunable laser according to the present invention has been made in a quite different point of view from a conventional manner wherein a usual diffraction grating, birefringent plate or the like is employed.

Namely, the present invention has been made such that when acoustic waves are generated in an acousto-optic crystal such as $TeO_2$ crystal and the like having birefringent characteristics, a plane of polarization of the diffraction light rays having a specified wavelength in response to a frequency of the acoustic waves among the light rays inputted to the crystal not only becomes orthogonal with respect to the plane of polarization of nondiffraction light rays, but also an output angle of the diffraction light rays deflects so as to be significantly different from that of the nondiffraction light rays.

FIG. 1 is a conceptual diagram indicating wavelength selecting action wherein polarizing action of light rays having a specified wavelength derived from acoustic waves is shown in which inputting light rays 102 having a wavelength $\lambda i$ and an angle frequency $\omega i$ is inputted into an acousto-optic crystal 100 having birefringent properties. Furthermore, when acoustic waves 104 having a frequency $\omega a$ is applied into an acousto-optic crystal 100, diffraction light rays 106 are obtained.

When a total reflection mirror 110 and a mirror having a prescribed transmittance on the output side 112 are disposed as shown, for example, in FIG. 2 with respect to the diffraction light rays 106 being a light ray component diffracted by the above described acousto-optic crystal 100, a laser resonator wherein the diffraction light rays reciprocates between the total reflection mirror 110 and the output mirror 112 is constituted.

In this case, a wavelength of the diffraction light rays 106 is decided dependent upon a wavelength of the acoustic waves 104 generated in the acousto-optic crystal 100, so that, for instance, a piezoelectric element driven by an RF power source is attached to the acousto-optic crystal 100 and when the piezoelectric element is-driven by the RF power-source to produce distortion in the piezoelectric element, tunable control of the laser wavelength becomes possible by controlling a frequency of the RF power source in the case where the acoustic waves 104 having the frequency in response to the distortion produced are inputted to the acousto-optic crystal 100.

Moreover, since diffraction efficiency of the diffraction light rays 106 is determined by acoustic wave intensity, loss in the laser resonator is controlled, when input intensity of the RF power source is controlled, and as a result tunable control of a laser output becomes possible.

However, a diffraction angle α 109 is not completely constant with respect to the wavelength of the diffraction light rays 106, so that a wavelength range in which the laser resonator can be constituted by means of vertical reflection of the total reflection mirror 110 with respect to the diffraction light rays 106 is narrow, thus a configuration angle of the total reflection mirror 110 must be adjusted bit by bit for the sake of making laser oscillation in a wide wavelength region. As a result there is a concern that the adjusting operation will become complicated from a practical point of view. Therefore, it is required to correct deflections of the diffraction angle α 109 by the use of any means for the sake of expanding a tunable wavelength range without changing the configuration angle of the total reflection mirror 110.

As a means for correcting deflections of the diffraction angle α 109, for example, an optical element dispersing a wavelength of light rays such as a triangular prism may be employed in such a manner that light rays having wavelengths of λ1, λ2 and a deflection angle Δα proceed in a substantially parallel manner after passing through the triangular prism. As a consequence, it becomes possible to input the diffraction light rays 106 to the total reflection mirror 110 always in a vertical direction, so that a laser resonator for a wide wavelength region can be constituted.

Furthermore, when there is concern that the outputting intensity of the laser increases so that the acousto-optic crystal 100 in the laser resonator is optically damaged (for example, in the case where $TeO_2$ crystal is used as the acousto-optic crystal 100, a crystal damage threshold value of the $TeO_2$ crystal is smaller than that of the laser crystal or the optical parts, so that the former crystal is easily damaged), an expanding means of the laser beam such as a telescope for expanding a beam diameter inputted to the acousto-optic crystal 100 is disposed in the laser resonator, whereby a possibility of damaging the acousto-optic crystal 100 can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The manners of practice for the wavelength selecting method in a wavelength tunable laser and the wavelength selectable laser oscillator in a wavelength tunable laser according to the present invention will be described in detail hereinafter on the basis of the accompanying drawings.

Figure 1:
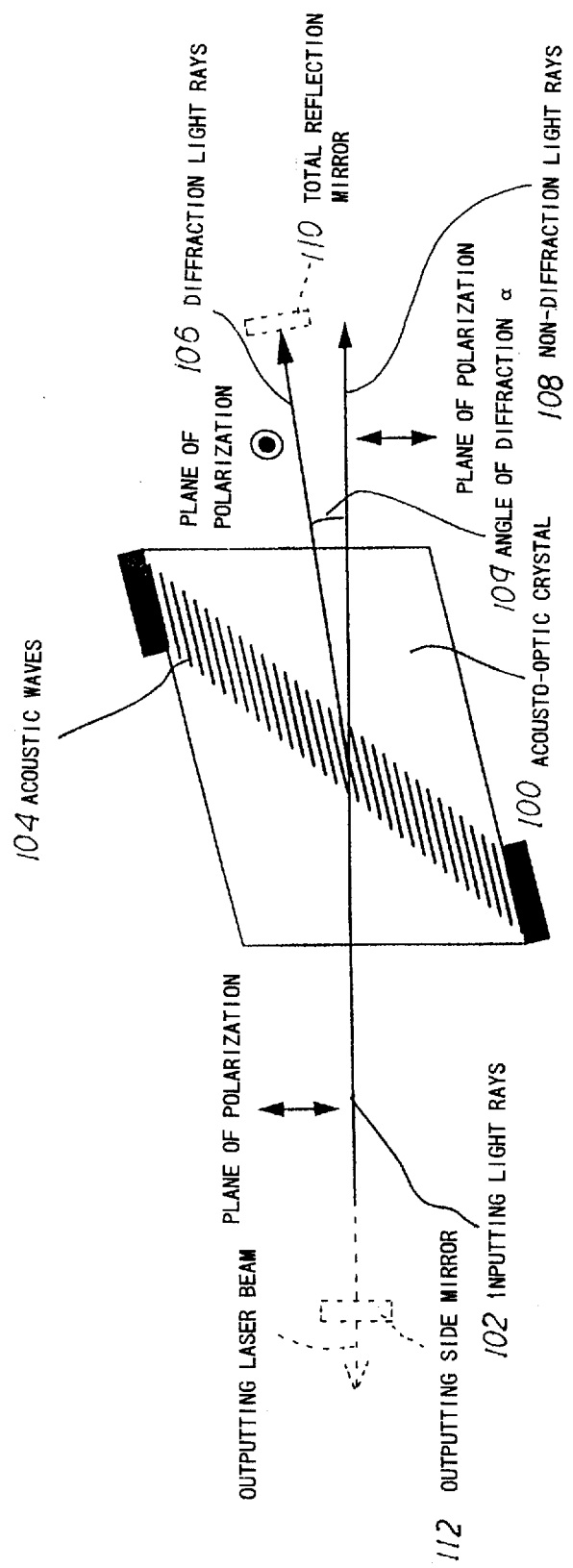
FIG. 1 is a conceptual diagram showing a wavelength selecting action wherein a diffracting action of light rays having a specified wavelength due to acoustic waves is utilized.
Figure 2:
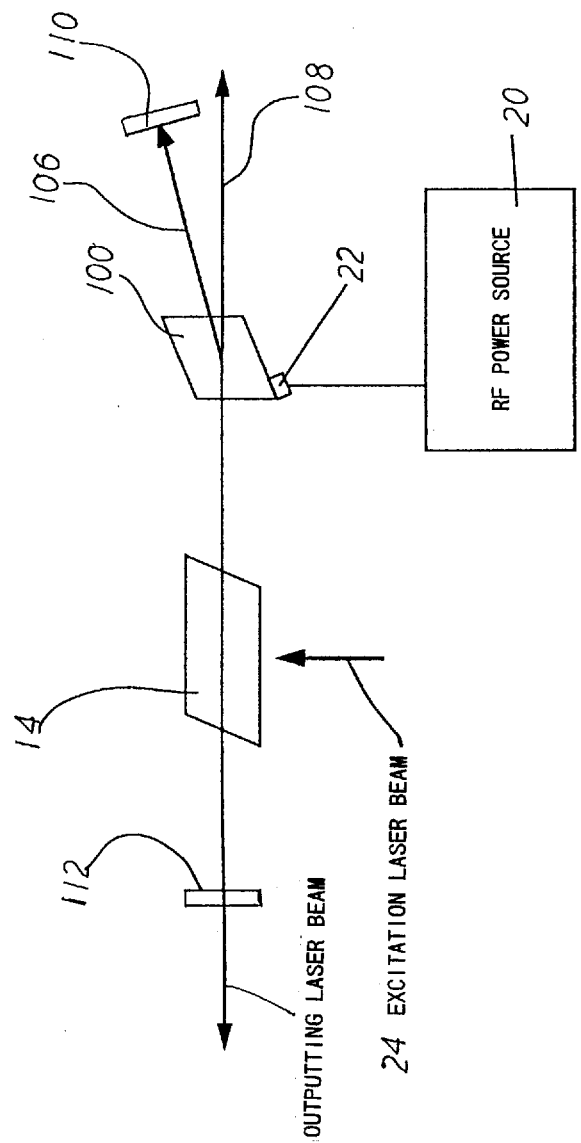
FIG. 2 is an explanatory diagram showing a schematic constitution of a wavelength selectable laser oscillator in a wavelength tunable laser for executing a wavelength selecting method in the wavelength tunable laser according to the first manner of practice of the present invention.

FIG. 2 is an explanatory diagram showing a schematic constitution of a wavelength selectable laser oscillator (hereinafter referred to simply as "laser oscillator") in a wavelength tunable laser for executing a wavelength selecting method in the wavelength tunable laser according to the first manner of practice of the present invention. It is to be noted that the same constitutional components as those shown in FIG. 1 are represented by the same reference numerals in FIG. 2 for easy understanding.

In the laser oscillator shown in FIG. 2, a laser resonator is constituted by a mirror having a prescribed transmittance on the output side 112 and a total reflection mirror 110.

In the laser resonator, a Ti:$Al_2O_3$ laser crystal 14 and an acousto-optic crystal 100 are disposed in this order along the direction extending from the side of the mirror on the output side 112 to the side of the total reflection mirror 110 as the wavelength tunable laser and the crystal for selecting wavelength, respectively.

To the acousto-optic crystal 100 is attached a piezoelectric element 22 driven by an RF power source 20 as the acoustic wave inputting means. Thus, when the piezoelectric element 22 is driven by means of the RF power source 20 to produce distortion in the piezoelectric element 22, acoustic waves having a frequency in response to the distortion thus produced is inputted to the acousto-optic crystal 100 on the basis of the aforesaid distortion of the piezoelectric element 22.

Furthermore, the total reflection mirror 110 is constituted so as to reflect only the diffraction light rays 106 diffracted in a prescribed direction by the acousto-optic crystal 100.

The piezoelectric element 22 is constituted such that acoustic waves are inputted to the acousto-optic crystal 100 such that only the light rays having a wavelength of outputting laser beam which is desired to output from the output mirror 112 are diffracted.

In the constitution as described above, second higher harmonics of an Nd:YAG laser is employed as an excitation laser beam 24 to excite the Ti:Al$_2$O$_3$ laser crystal 14. Moreover, based on the principle described above, a frequency of the RF power source 20 is controlled in response to a wavelength of the outputting laser beam which is desired to output from the outputting mirror 112 to drive the piezoelectric element 22.

When the components are arranged as described above, the outputting light rays having a wavelength in response to the frequency of the RF power source 20 are diffracted in a prescribed direction to be outputted from the acousto-optic crystal 100 as the diffraction light rays 106 among outputting light rays having a wide range of wavelength zone outputted from the Ti:Al$_2$O$_3$ laser crystal 14 which were inputted to the acousto-optic crystal 100. As a result, only the diffraction light rays 106 which are outputted from the acousto-optic crystal 100 and diffracted in a prescribed direction are reflected by the total reflection mirror 110 to reciprocate the same in the laser resonator.

Thus, only the light rays in response to the frequency of the RF power source 20 are amplified to produce laser oscillation. whereby only the outputting laser beam having the very frequency can be outputted from the laser oscillator.

Figure 3:
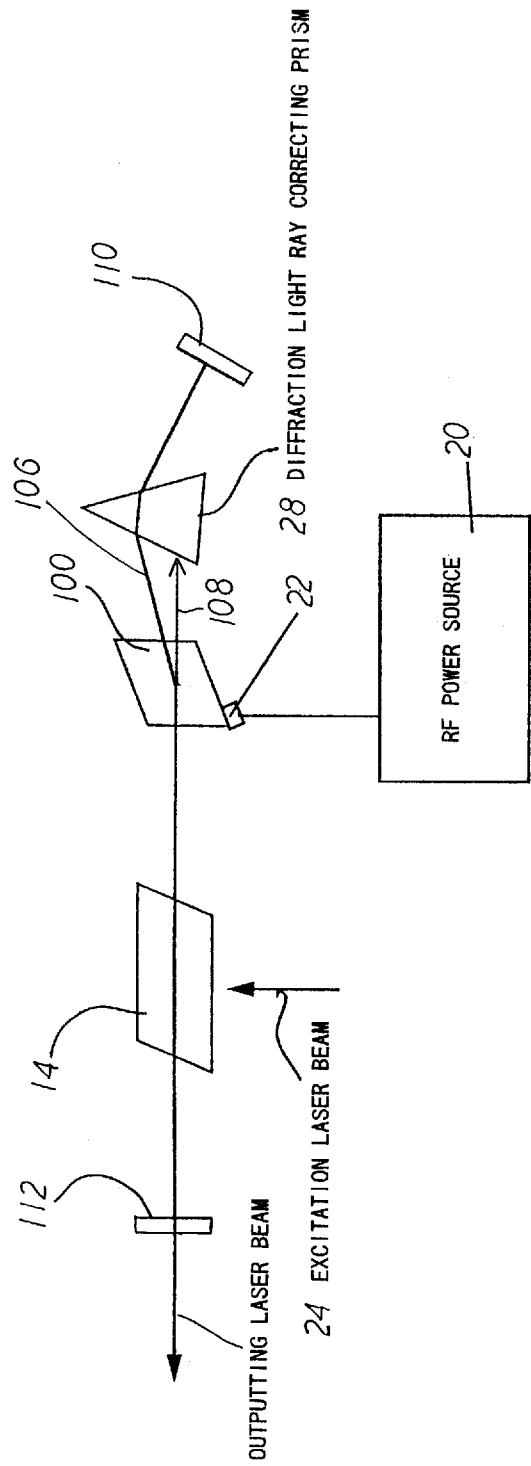
FIG. 3 is an explanatory diagram showing a schematic constitution of a wavelength selectable laser oscillator in a wavelength tunable laser for executing a wavelength selecting method in the wavelength tunable laser according to the second manner of practice of the present invention.

FIG. 3 is a schematic diagram showing a constitution of the laser oscillator according to the second manner of practice of the present invention wherein the same constitutional components as those shown in FIGS. 1 and 2 are represented by the same reference numerals in FIG. 3 for easy understanding.

In the laser oscillator according to the second manner of practice of the present invention, a laser resonator is constituted by an output mirror 112 having a prescribed transmittance and a total reflection mirror 110 in the same way as in the laser oscillator according to the first manner of practice.

In the laser resonator, a Ti:Al$_2$O$_3$ laser crystal 14, an acousto-optic crystal 100, and a prism for correcting diffraction light rays 28 are disposed in this order along the direction extending from the side of the output mirror 112 to the side of the total reflection mirror 110, respectively.

The prism for correcting diffraction light rays 28 is constituted so as to always output diffraction light rays 106 outputted from the acousto-optic crystal 100 in a constant direction irrespective of wavelength, and the total reflection mirror 110 is constituted so as to reflect the light rays outputted from the prism for correcting diffraction light rays 28.

In the same way as in the above described first manner of practice, a piezoelectric element 22 is constituted such that acoustic waves are inputted to the acousto-optic crystal 100 so as to diffract only the outputting light rays having a wavelength of the outputting laser beam which is desired to be output from the output mirror 112 in a prescribed direction.

In the above described constitution, the second harmonics of an Nd:YAG laser is used as an excitation laser beam 24 to excite the Ti:Al$_2$O$_3$ laser crystal 14. Furthermore, based on the above described principle, a frequency of an RF power source 20 is controlled in response to a given wavelength of the laser which is set to output from the output mirror 112 by driving the piezoelectric element 22.

When the components are arranged as described above, the outputting light rays having a wavelength in response to the frequency of the RF power source 20 are diffracted in a prescribed direction to be outputted from the acousto-optic crystal 100 as the diffraction light rays 106 among outputting light rays having a wide range of wavelength zone outputted from the Ti:Al$_2$O$_3$ laser crystal 14 which were inputted to the acousto-optic crystal 100. Furthermore, the diffraction light rays 106 which are diffracted in a prescribed direction and outputted from the acousto-optic crystal 100 are inputted to the prism for correcting diffraction light rays 28 and outputted in a constant direction. As a result, light rays outputted from the prism for correcting diffraction light rays 28 are reflected by the total reflection mirror 110, whereby they reciprocate in the laser resonator.

Thus, only the light rays in response to the frequency of the RF power source 20 are amplified to produce laser oscillation. whereby only the outputting laser beam having the very frequency can be outputted from the laser oscillator.

Figure 4:
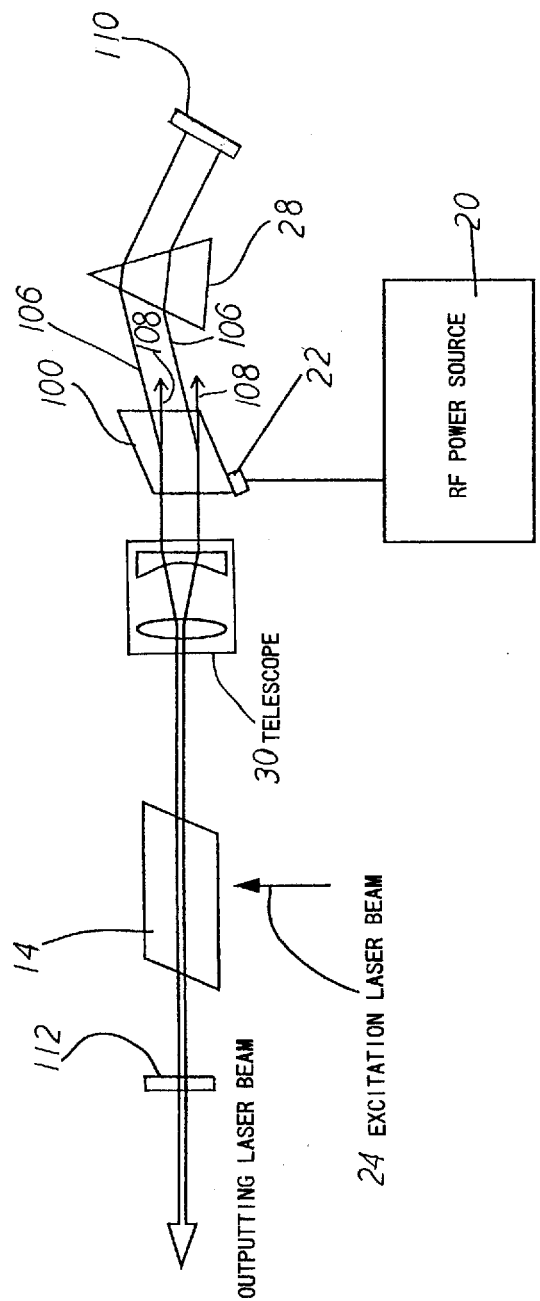
FIG. 4 is an explanatory diagram showing a schematic constitution of a wavelength selectable laser oscillator in a wavelength tunable laser for executing a wavelength selecting method in the wavelength tunable laser according to the third manner of practice of the present invention.

FIG. 4 is a schematic diagram showing a constitution of the laser oscillator according to the third manner of practice of the present invention wherein the same constitutional components as those shown in FIGS. 1, 2 and 3 are represented by the same reference numerals in FIG. 4 for easy understanding.

In the laser oscillator according to the third manner of practice of the present invention, a laser resonator is constituted by an output mirror 112 having a prescribed transmittance and a total reflection mirror 110 in the same way as in the laser oscillator according to the second manner of practice.

In the laser resonator, a Ti:Al$_2$O$_3$ laser crystal 14, a telescope for adjusting a beam diameter 30, an acousto-optic crystal 100, and a prism for correcting diffraction light rays 28 are disposed in this order along the direction extending from the side of the output mirror 112 to the side of the total reflection mirror 110, respectively.

The telescope 30 is constituted in such that a beam diameter of light rays inputted to the acousto-optic crystal 100 can be enlarged to a desired size.

In this case, the prism for correcting diffraction light rays 28 is constituted so as to always output the light rays outputted from the acousto-optic crystal 100 in a constant direction irrespective of wavelength, and the total reflection mirror 110 is constituted so as to reflect the light rays outputted from the prism for correcting diffraction light rays 28 in the same way as in the second manner of practice. Furthermore, a piezoelectric element 22 is constituted such that acoustic waves are inputted to the acousto-optic crystal 100 so as to diffract only the outputting light rays having a wavelength of the outputting laser beam which is desired to be output from the output mirror 112 in a prescribed direction.

In the above described constitution, the second harmonics of an Nd:YAG laser is used as an excitation laser beam 24 to excite the Ti:Al$_2$O$_3$ laser crystal 14. Furthermore, based on the above described principle, a frequency of an RF power source 20 is controlled in response to a wavelength of the outputting laser beam which is desired to be output from the output mirror 112 by driving the piezoelectric element 22.

When the components are arranged as described above, the outputting light rays having a wide range of wavelength zone and outputted from the Ti:Al$_2$O$_3$ laser crystal 14 are inputted to the acousto-optic crystal 100 with expansion to a desired size in the beam diameter thereof by means of the telescope 30.

Accordingly, in the case where output intensity of a laser increases, since a beam diameter of the light rays inputted to the acousto-optic crystal 100 is expanded by means of the telescope 30, an output intensity of the light rays inputted to the acousto-optic crystal 100 per unit area of the acousto-optic crystal 100 decreases, so that damage of the acousto-optic crystal 100 can be suppressed.

Outputting light rays having a wavelength in response to the frequency of an RF power source 20 are diffracted in a prescribed direction to be outputted from the acousto-optic crystal 100 as diffracted light rays 106 among the outputting light rays outputted from the Ti:Al$_2$O$_3$ laser crystal 14 having a wide range of wavelength zone which were inputted to the acousto-optic crystal 100 by way of the telescope 30; Furthermore, the diffraction light rays 106 outputted from the acousto-optic crystal 100 which had been diffracted in a prescribed direction are inputted to the prism for correcting diffraction light rays 28 to be outputted in a constant direction. The light rays outputted from the prism for correcting diffraction light rays 28 are reflected by the total reflection mirror 110, whereby they reciprocate in the laser resonator.

As a result, only the light rays having a wavelength in response to the frequency of the RF power source 20 are amplified to produce laser oscillation, whereby only the outputting laser beam having the very wavelength can be outputted from the laser oscillator.

Figure 5:
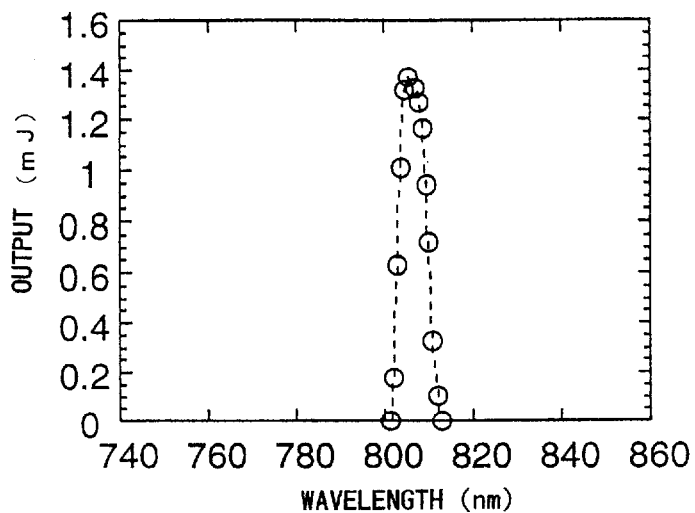
FIG. 5 is a graphical representation indicating a relationship between the output of outputting a laser beam and the wavelength thereof in the case where the frequency of an RF power source is varied in the experiment where the laser oscillator shown in the first manner of practice is utilized.

FIG. 5 is a graphical representation showing results of experiments by the use of the laser oscillator illustrated in the first manner of practice shown in FIG. 2 under the following experimental conditions which indicates a relationship between the output of an outputting laser beam and the wavelength in the case where a frequency of the RF power source 20 is changed. As is apparent from the experimental results shown in FIG. 5, when the laser oscillator shown in the first manner of practice is employed, laser oscillation can be conducted by selecting an arbitrary wavelength within a wavelength range of from about 800 nm to about 811 nm.

(FIG. 5: Experimental Conditions)

Excitation laser beam 24: Second harmonics (pulse laser) of an Nd:YAG laser having 532 nm wavelength, 155 mJ/pulse energy, and 8 ns pulse width)

Output mirror 112: 60% reflection

Total reflection mirror 110: 99.9% reflection in wavelength 800 nm

RF power source 20: Frequency tunable range 40 MHz to 150 MHz Input Electric Power 0 W to 1 W Acousto-optic crystal 100: Diffraction efficiency 98%

Figure 6:
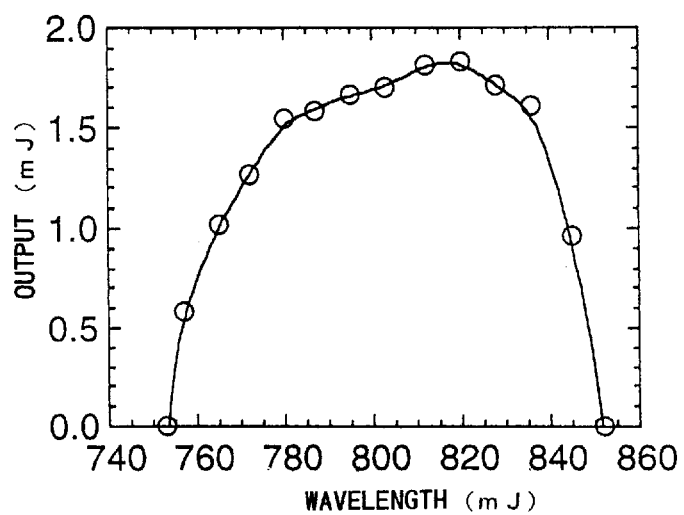
FIG. 6 is a graphical representation indicating a relationship between the output of outputting a laser beam and the wavelength thereof in the case where the frequency of an RF power source is varied in the experiment where the laser oscillator shown in the second manner of practice is utilized.

Moreover, FIG. 6 is a graphical representation showing results of experiments using the laser oscillator illustrated in the third manner of practice shown in FIG. 4 under the following experimental conditions which indicates a relationship between the output of the outputting laser beam and the wavelength in the case where a frequency of the RF power source 20 is changed. As is apparent from the experimental results shown in FIG. 6, when the laser oscillator shown in the second or third manner of practice is employed, laser oscillation can be conducted by selecting an arbitrary wavelength within a wavelength range of from about 750 nm to about 850 nm.

(FIG. 6: Experimental Conditions)

Excitation laser beam 24: Second harmonics (pulse laser) of an Nd:YAG laser having 532 nm wavelength, 155 mJ/pulse energy, and 8 ns pulse width)

Output mirror 112: 60% reflection

Total reflection mirror 110: 99.9% reflection in wavelength 800 nm

RF power source 20: Frequency tunable range 40 MHz to 150 MHz Input Electric Power 0 W to 1 W Acousto-optic crystal 100: Diffraction efficiency 98%

Figure 7:
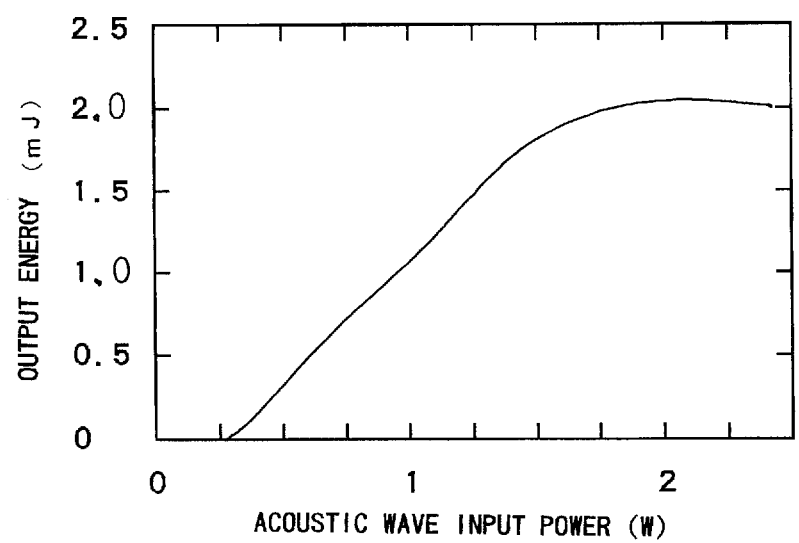
FIG. 7 is a graphical representation indicating a relationship between the output of outputting laser beam and the wavelength thereof in the case where the intensity of acoustic waves to be inputted to the acousto-optic crystal is varied in the experiment where the laser oscillator shown in the second manner of practice is utilized.

Furthermore, FIG. 7 indicates changes in an output of the outputting laser beam in the case where intensity of the acoustic waves 104 inputted to the acousto-optic crystal 100 is changed by employing the laser oscillator shown in the second manner of practice of FIG. 3. As is apparent from the experimental results shown in FIG. 7, when intensity of the acoustic waves 104 inputted to the acousto-optic crystal 100 changes from 0.5 W to 2.0 W, the output of the outputting laser beam changes also in response thereto, so that when the intensity of the acoustic waves 104 inputted to the acousto-optic crystal 100 is varied, it becomes possible to change the output of the outputting laser beam.

While the case of pulsed excitation wherein a Ti:Al$_2$O$_3$ laser crystal is used as the laser medium has been explained in each of the above described manners of practice, the invention is not limited thereto, that is also applicable to a liquid laser wherein dye solution or the like is used as a laser medium, or a continuous light excitation type laser.

Since the present invention has been constituted as described above, the wavelength of an outputting laser beam can be selected without providing any mechanically movable section such as a rotating mechanism and the like, miniaturization of the whole equipment and a stable wavelength selecting action can be realized.

More specifically, the present invention has been constituted to electrically control a laser wavelength to sweep the wavelength at a high scanning rate with the provision of no mechanically movable section such as a rotating mechanism and the like, so that it becomes possible to intend accomplish miniaturization of the whole equipment and an acousto-optic crystal which is widely used and has high reliability may be employed as an independent component, whereby the present invention can realize a stable wavelength selecting action.

Furthermore, when an optical element for correcting a deflection angle of diffraction light rays such as a prism for correcting diffraction light rays and the like is employed, it becomes possible to output an outputting laser beam in a wide rage of a wavelength region.

Moreover, when an expanding means for controlling a beam diameter of light rays inputted to an acousto-optic crystal such as a telescope and the like is employed, light intensity of the light rays inputted to the acousto-optic crystal per unit area thereof can be reduced, whereby it becomes possible to realize a outputting laser beam of a high output while suppressing damage of the acousto-optic crystal.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A wavelength selecting method in a wavelength tunable laser wherein a crystal to which have been inputted acoustic waves is disposed in a laser resonator, and a wavelength tunable laser capable of laser oscillation in the wavelength range of a prescribed region is inputted to said crystal, thereby controlling the wavelength in response to a frequency of said acoustic waves comprising:

an acousto-optic crystal having birefringent properties being employed as said crystal thereby to constitute the laser resonator with respect to only the light ray component which is diffracted by said acousto-optic crystal in a specified direction.

2. A wavelength selecting method in a wavelength tunable laser as claimed in claim 1, wherein a variation of an angle of deflection due to a wavelength of the light ray component which is diffracted by said acousto-optic crystal in a specified direction is corrected by the use of a wavelength dispersing optical element.

3. A wavelength selecting method in a wavelength tunable laser as claimed in claim 1, wherein a beam diameter of light rays inputted to said acousto-optic crystal is expanded to suppress damage of said acousto-optic crystal.

4. A wavelength selecting method in a wavelength tunable laser as claimed in claim 2, wherein a beam diameter of light rays inputted to said acousto-optic crystal is expanded to suppress damage of said acousto-optic crystal.

5. A wavelength selecting method in a wavelength tunable laser as claimed in claim 1, wherein the intensity of acoustic waves to be inputted to said acousto-optic crystal is changed to control the laser output.

6. A wavelength selecting method in a wavelength tunable laser as claimed in claim 2, wherein the intensity of acoustic waves to be inputted to said acousto-optic crystal is changed to control the laser output.

7. A wavelength selecting method in a wavelength tunable laser as claimed in claim 3, wherein the intensity of acoustic waves to be inputted to said acousto-optic crystal is changed to control the laser output.

8. A wavelength selecting method in a wavelength tunable laser as claimed in claim 4, wherein the intensity of acoustic waves to be inputted to said acousto-optic crystal is changed to control the laser output.

9. A wavelength selectable laser oscillator in a wavelength tunable laser comprising:

a laser resonator composed of opposed mirrors each having a prescribed reflectivity, a wavelength tunable laser medium disposed within said laser resonator and being capable of laser oscillation in the wavelength range of a prescribed region, an acousto-optic crystal having birefringent properties disposed in said laser resonator and to which are inputted the outputting light rays from said wavelength tunable laser medium, wherein only a light ray component diffracted by said acousto-optic crystal in a specified direction is reflected by the opposed mirrors and an acoustic wave inputting means mounted on said acousto-optic crystal and for inputting acoustic waves to said acousto-optic crystal.

10. A wavelength selectable laser oscillator in a wavelength tunable laser comprising:

a laser resonator composed of opposed mirrors each having a prescribed reflectivity, a wavelength tunable laser medium disposed within said laser resonator and being capable of laser oscillation in the wavelength zone of a prescribed range, an acousto-optic crystal disposed in said laser resonator and to which are inputted the outputting light rays from said wavelength tunable laser medium, an acoustic wave inputting means mounted on said acousto-optic crystal and for inputting acoustic waves to said acousto-optic crystal, and an optical element disposed within said laser resonator and correcting an angle of deflection of the diffraction light rays outputted from said acousto-optic crystal.

11. A wavelength selectable laser oscillator in a wavelength tunable laser as claimed in claim 9, comprising further an expanding means disposed within said laser oscillator and expanding a beam diameter of the outputting light rays from said wavelength tunable laser medium and to be inputted to said acousto-optic crystal.

12. A wavelength selectable laser oscillator in a wavelength tunable laser as claimed in claim 10, comprising further an expanding means disposed within said laser oscillator and expanding a beam diameter of the outputting light rays from said wavelength tunable laser medium and to be inputted to said acousto-optic crystal.

* * * * *